United States Patent
Bhutani et al.

(10) Patent No.: US 10,827,383 B2
(45) Date of Patent: Nov. 3, 2020

(54) COLLISION DETECTION METHOD

(71) Applicant: Lutron Technology Company LLC, Coopersburg, PA (US)

(72) Inventors: Ankit Bhutani, Aston, PA (US); Richard S. Camden, Coopersburg, PA (US); Galen E. Knode, Macungie, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 16/284,780

(22) Filed: Feb. 25, 2019

(65) Prior Publication Data

US 2019/0268802 A1 Aug. 29, 2019

Related U.S. Application Data

(60) Provisional application No. 62/634,746, filed on Feb. 23, 2018.

(51) Int. Cl.
| | |
|---|---|
| *H04W 24/08* | (2009.01) |
| *H04W 28/04* | (2009.01) |
| *H04L 1/20* | (2006.01) |
| *H04L 1/00* | (2006.01) |
| *H04B 17/318* | (2015.01) |
| *H04L 7/04* | (2006.01) |

(52) U.S. Cl.
CPC .......... *H04W 28/04* (2013.01); *H04B 17/318* (2015.01); *H04L 1/0083* (2013.01); *H04L 1/206* (2013.01); *H04L 7/042* (2013.01)

(58) Field of Classification Search
CPC .................................................... H04W 28/04
See application file for complete search history.

(56) References Cited

U.S. PATENT DOCUMENTS

| | | | |
|---|---|---|---|
| 6,803,728 B2 | 10/2004 | Balasubramanium et al. | |
| 7,126,291 B2 | 10/2006 | Kruse et al. | |
| 7,573,208 B2 | 8/2009 | Newman, Jr. | |
| 9,214,973 B1* | 12/2015 | Venkatesh | ............ H04B 1/1036 |
| 9,313,754 B2* | 4/2016 | Zhang | ................ H04B 1/70735 |
| 9,414,202 B1* | 8/2016 | Srinivasa | ................ H04W 4/80 |

(Continued)

FOREIGN PATENT DOCUMENTS

| | | |
|---|---|---|
| EP | 2741436 A1 | 6/2014 |
| EP | 2779535 A1 | 9/2014 |
| JP | 2009278536 A | 11/2009 |

*Primary Examiner* — Parth Patel
(74) *Attorney, Agent, or Firm* — Flaster Greenberg, P.C.

(57) ABSTRACT

A wireless device may receive packets according to a protocol, such as Bluetooth, and may rapidly react to receive an interfering RF packet instead of dropping the first RF packet and the interfering RF packet, to decrease message delay due to collisions in high device density environments. When a received signal strength indicator (RSSI) difference between the interfering RF packet and the first RF packet exceeds a threshold, the device may detect the interfering packet and resync a portion of its circuitry to lock on to and receive the interfering packet. The wireless receiver may detect the interfering RF packet by detecting one or more of: a specific resync byte sequence, an increase in RSSI, or a phase shift. Additionally, a wireless device may add the specific resync byte sequence to an RF packet of a standard protocol.

14 Claims, 9 Drawing Sheets

(56) References Cited

U.S. PATENT DOCUMENTS

| | | | |
|---|---|---|---|
| 10,041,292 B2 | 8/2018 | Cooney et al. | |
| 10,339,755 B2 | 7/2019 | Crafts et al. | |
| 2006/0262721 A1 | 11/2006 | Radunovic et al. | |
| 2008/0137570 A1* | 6/2008 | Min | H04B 1/005 370/310 |
| 2009/0168849 A1* | 7/2009 | Rouxel | H04B 1/707 375/140 |
| 2009/0168939 A1* | 7/2009 | Constantinidis | H04W 52/028 375/359 |
| 2010/0303183 A1* | 12/2010 | Desai | H04B 1/1027 375/350 |
| 2011/0194413 A1* | 8/2011 | Radunovic | H04W 28/18 370/241 |
| 2012/0171954 A1 | 7/2012 | Rudland et al. | |
| 2013/0083648 A1* | 4/2013 | de Ruijter | H04L 69/40 370/216 |
| 2014/0357194 A1* | 12/2014 | Jin | H04W 8/005 455/41.2 |
| 2015/0030061 A1* | 1/2015 | de Ruijter | G06F 13/4295 375/226 |
| 2015/0236753 A1* | 8/2015 | Pande | H04B 3/544 375/257 |
| 2016/0157249 A1* | 6/2016 | Sutterlin | H04L 12/413 370/329 |
| 2016/0192034 A1* | 6/2016 | Yamane | H04N 21/2362 725/33 |
| 2016/0255704 A1* | 9/2016 | Mueller | H04W 84/18 315/307 |
| 2016/0373279 A1* | 12/2016 | Lopez | H04L 5/0053 |
| 2017/0171359 A1* | 6/2017 | Ando | H04Q 9/00 |
| 2018/0103411 A1* | 4/2018 | Greene | H05B 47/11 |
| 2018/0254897 A1* | 9/2018 | Nix | H04W 80/04 |
| 2019/0008017 A1* | 1/2019 | Modi | H04L 67/12 |
| 2019/0268802 A1* | 8/2019 | Bhutani | H04B 17/318 |

\* cited by examiner

COLLISION DETECTION METHOD

CROSS-REFERENCE TO RELATED APPLICATIONS

This application claims priority to U.S. Provisional Patent Application No. 62/634,746, filed Feb. 23, 2018, the entire disclosure of which is incorporated by reference herein.

BACKGROUND

Wireless congestion is an issue for many wireless communication protocols, particularly Bluetooth, wherein the collision of radiofrequency (RF) packets can cause wireless receivers to drop both RF packets. As the density of wireless devices in a space increases, the number of wireless devices transmitting in the same or overlapping channels of a frequency band increases, which increases the probability of RF packet collisions occurring. Packet collisions may cause a first RF packet and an incoming colliding RF packet to both be lost (i.e., dropped), which may undermine the reliability of communication.

This problem is typically mitigated by transmitting multiple redundant RF packets to ensure that at least one of the redundant messages will be successfully received by a wireless receiver without being lost due to a collision. However, if the first several RF packets of a group of redundant RF packets are lost due to one or more RF packet collisions, there may be a time delay between the time when the first RF packet was sent and the time when a later redundant RF packet is received. This time delay is undesirable, and indeed may be unacceptable, for systems that require fast response times, for example, lighting control systems. Therefore, it is desirable that a wireless receiver be able to detect when a packet collision is occurring, and to further recover and receive the interfering packet.

SUMMARY

Described herein is a solution wherein a wireless receiver may begin receiving a first RF packet, subsequently detect an interfering RF packet (i.e., detect a packet collision) and react in a rapid fashion to receive the interfering RF packet instead of dropping both the first RF packet and the interfering RF packet. This solution may be applicable to any protocol, such as Bluetooth, for example. When a received signal strength indicator (RSSI) difference between the interfering RF packet and the first RF packet is greater than a threshold, the wireless receiver may be able to detect the presence of the interfering packet during receipt of the first packet.

Upon detecting the interfering RF packet, the wireless receiver may then reset a portion of its circuitry (resynchronize) to quickly lock on (i.e., synchronize) to the interfering packet to receive the interfering packet. This may allow the wireless receiver to react in a rapid fashion to receive the interfering packet, instead of dropping both the first RF packet and the interfering packet.

The wireless receiver may detect the interfering RF packet according to any or a combination of three different ways: detecting a specific resync byte sequence (presync), detecting an increase in RSSI during receipt of the first RF packet, or detecting a phase shift in one or more data symbols during receipt of the first RF packet. This may allow the wireless receiver to prioritize packets in close proximity to the wireless device and/or RF packets requiring higher priority, for example, lighting control packets.

Additionally, described herein is a method for a wireless transmitter of a wireless device to add the specific resync byte sequence to an RF packet of a standard protocol, such as Bluetooth. Although Bluetooth is used as an example throughout this description, one will recognize that the examples described herein may additionally be applicable to other standard protocols (e.g., ZigBee, Z-Wave, etc.).

DETAILED DESCRIPTION

Figure 1:
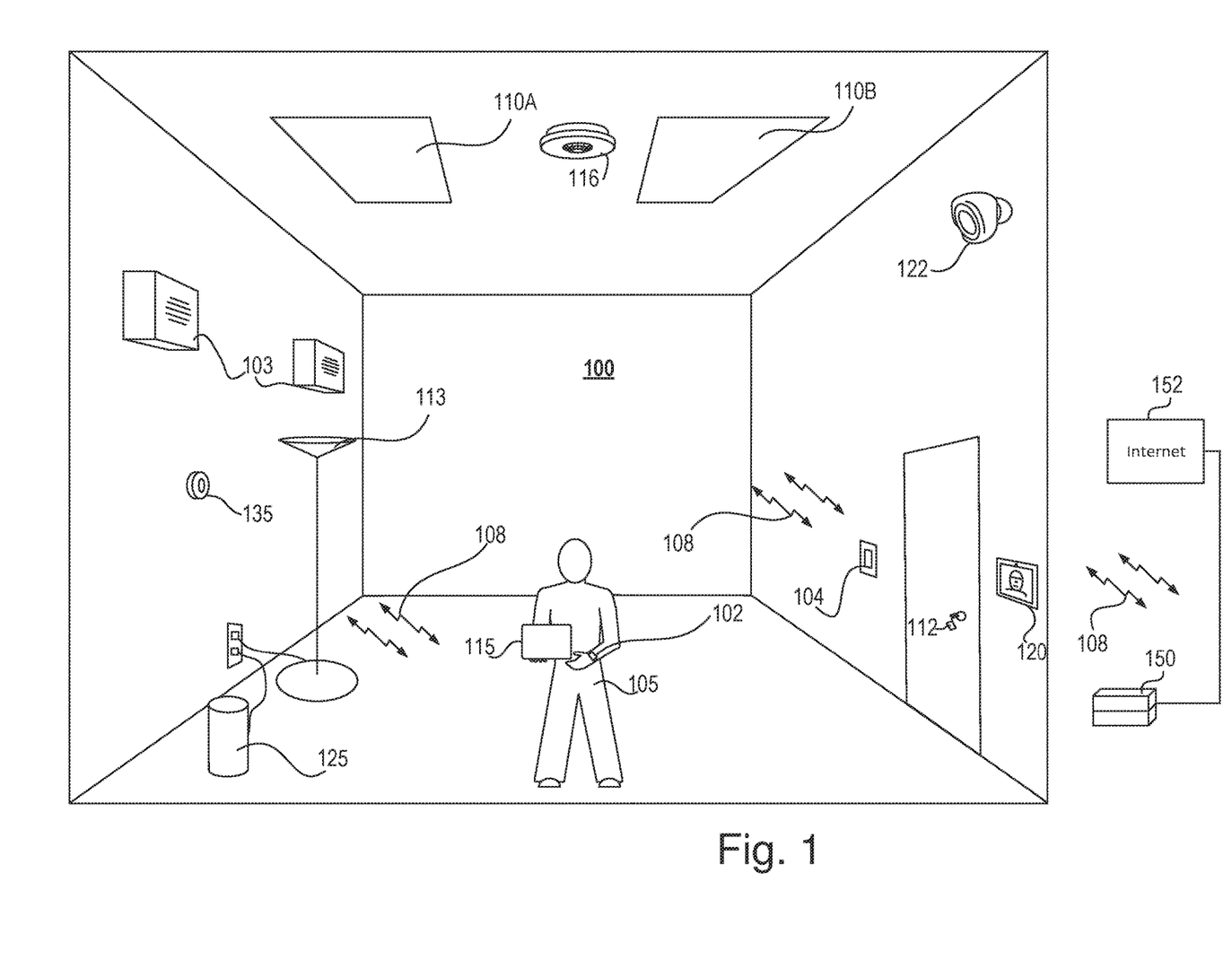
FIG. 1 is an example space with various wireless devices.

FIG. 1 is an example room 100 containing a number of wireless devices, that is, devices which transmit radiofrequency waves. The wireless devices may include, for example, one or more wireless audio speakers 103 for playing music received from a streaming device, such as tablet 115 or a voice assistant device 125 (although other wireless devices may also be used as a streaming device, such as a phone, laptop, PC, etc.). For example, the tablet 115 may stream audio from an Internet-based music service, and may wirelessly transmit the audio stream to the speakers 103 for playing the audio in the room 100.

The room 100 may include a camera 122 and/or a webcam or video intercom 120. The video intercom may include a camera, a microphone, and/or a speaker. The camera 122 and video intercom 120 may wirelessly communicate with the tablet 115, with each other, or with the wireless speakers 103. The video intercom may record images and audio of the user environment and transmit the images and audio data to a remote device, such as another video intercom, a tablet, a PC, etc.

The room 100 may also include one or more asset tracking devices, such as one or more beacon devices, for example. For example, the room 100 may include a beacon device such as key fob 112, shown attached to a set of keys. The key fob 112 may wirelessly communicate to one or more devices, such as the tablet 115 and/or a smartphone to alert a user 105 of the location of the key fob 112 when the user 105 has misplaced it.

The user 105 may have one or more wearable wireless devices, for example a smartwatch 102. The one or more wearable wireless devices may communicate periodically to a smartphone (not shown) or other device. For example, the smartwatch may communicate with a smartphone or the tablet 115 for displaying incoming text messages received by the smartphone or tablet 115 on a face of the smartwatch screen so that the user 105 may more easily notice that a text message has been received. The user 105 may additionally use any number of wearable wireless devices, including, but not limited to: health or activity trackers such as Fitbit®, smart glasses, wireless headphones, smart shoes, etc. Any or all of these wearable wireless devices may wirelessly communicate with a smartphone or the tablet 115.

The room 100 may also contain wireless devices which may control electrical loads, for example, as part of a load control system. For example, the room 100 may have a wireless thermostat 135 for wirelessly controlling an HVAC system. Room 100 may also have a lighting control system having one or more wireless light sources, such as overhead lights 110A, 110B, and lamp 113. The lighting control system may further include a wireless remote control 104 which may control one or more of the overhead lights 110A, 110B and/or the lamp 113. The lighting control system may also include one or more wireless occupancy sensors 116. The wireless occupancy sensor may be a passive infrared, microwave, ultrasonic, thermopile array, or any other type of occupancy sensor or combination of these listed herein. The wireless occupancy sensor may detect movement in the room 100 and may transmit wireless commands based on the occupancy detection to other wireless devices in the room 100 in order to control one or more electrical loads, for example, lighting loads 110A, 110B.

One will understand that the wireless devices shown in the room 100 are intended as an example, and that different, fewer, or more wireless devices may be present in any given space. Many of the wireless devices shown may periodically transmit RF packets 108, or aperiodically based on an event. For example, the smartwatch 102 may periodically receive updates from the tablet 115 or a smartphone (not shown) in order to update the current time, or aperiodically to receive a text message, etc. In another example, the remote control device 104 may transmit an RF packet 108 comprising a lighting command to the one or more lighting loads 110A, 110B in response to a button press on the remote control device 104.

The wireless devices in room 100 may each wirelessly communicate messages within RF packets 108 in the same, or near the same, frequency band. For example, the wireless devices may communicate using a protocol. For the purposes of this description, Bluetooth is used as an example protocol (e.g., a Bluetooth protocol as specified by Bluetooth 4.2 or later); however, one will understand that the processes and devices described herein are not limited to any specific protocol, but may be applied to any number of different wireless protocols, such as standard protocols as defined by ANSI, IEEE, etc., or proprietary protocols, such as ClearConnect™.

As the number of devices transmitting within the same frequency band in the room 100 increases, the transmitted messages (i.e., RF packets) may interfere with one another. For example, a wireless receiver, such as one of the speakers 103, may be configured to receive a standard protocol RF packet (such as a Bluetooth packet). Although the tablet 115 may send RF packets intended for the speakers 103, other RF packets transmitted at a similar time in close proximity may also be received by the speakers 103. For example, the thermostat 135 may transmit an RF packet within the same frequency band, and/or using the same standard protocol as the RF packet from the tablet 115. The RF packet sent by the thermostat 135 and the RF packet sent by the tablet 115 may both be received by the speakers 103 at approximately the same time. The two RF packets received at the same time by the wireless receiver of the speakers 103 may interfere with each other, causing the speaker 103 to drop both packets, such that neither message within either RF packet is processed.

To complicate the interference problem, the wireless devices located within the room 100 may further communicate with (i.e., receive RF packets from) one or more devices that are not located within the room 100. For example, the wireless devices within the room 100 may receive RF packets from other lighting control devices located in one or more adjacent rooms or spaces (not shown), for example, one or more remote controllers, a system controller 150, etc. That is, the RF packets received from outside of the room 100 may be in the same frequency band as the frequency band on which the wireless devices located in the room 100 communicate.

While the wireless devices in the room 100 may be configured to receive external RF packets from the other wireless devices outside of the room 100, the external RF packets may be less relevant than the RF packets from the wireless devices in the room 100. For example, the wireless devices within the room 100 may primarily respond to other wireless devices in close proximity (i.e., within the room 100), while external RF packets received from outside the room 100 may typically not be relevant to the wireless devices within the room 100. However, when the wireless devices within the room 100 receive external RF packets, the external RF packets may engage the wireless transceivers of the wireless devices within the room 100, which may increase the probability of interference, i.e., dropping relevant RF packets received from other wireless devices within the room 100. One method to mitigate the external RF packets received by the wireless devices within the room 100 is to limit the wireless range of the wireless devices within the room 100 to only receive RF packets from other wireless devices in close proximity (i.e., to within the room 100). For example, the wireless devices within the room 100 may mute or degrade their wireless receivers such that RF packets which are not in close proximity to the wireless device (i.e., external RF packets not within room 100) may not be received. Additionally or alternatively, the wireless devices within room 100 (and/or the wireless devices outside of the room 100) may reduce the transmit power of transmitted RF packets to limit the wireless range that the message may be received.

However, it may be desirable that certain external RF packets from outside of the room 100 be received by one or more wireless devices within the room 100. For example, the system controller 150 may be connected to the internet 152 (via a router, for example) to receive one or more updates (i.e., software updates). The system controller 150 may wirelessly communicate with one or more wireless devices in the room 100 to update the devices or to communicate other messages regarding system functionality, for example, instructing one or more lighting control devices 110A, 110B to go into an emergency mode. In this case, the system controller may coordinate (i.e., create a schedule) with one or more wireless devices in the room 100, such that one or more of the wireless devices in the room 100 may maintain a reduced wireless range and selectively increase their respective wireless range at specific times or time intervals to receive RF packets from devices outside of the room 100, such as the system controller 150.

Alternatively or additionally, one or more of the wireless devices in room 100 may maintain the increased wireless range (thereby remaining receptive to RF packets from outside the room 100, including irrelevant RF packets), while being configured to prioritize relevant RF packets, thereby mitigating RF collisions. For example, while one or more of the wireless devices in the room 100 receives a first packet, the wireless device(s) may be configured to detect when an interfering relevant RF packet is also being received, and the wireless device(s) may react in a rapid fashion to receive the interfering relevant RF packet. That is, a wireless device may resync its wireless receiver to drop the first packet and receive the interfering relevant RF packet. The relevant RF packet may be marked by a specific resync byte sequence, a higher RSSI, and/or a phase shift, as will be described in greater detail herein.

Figure 2:
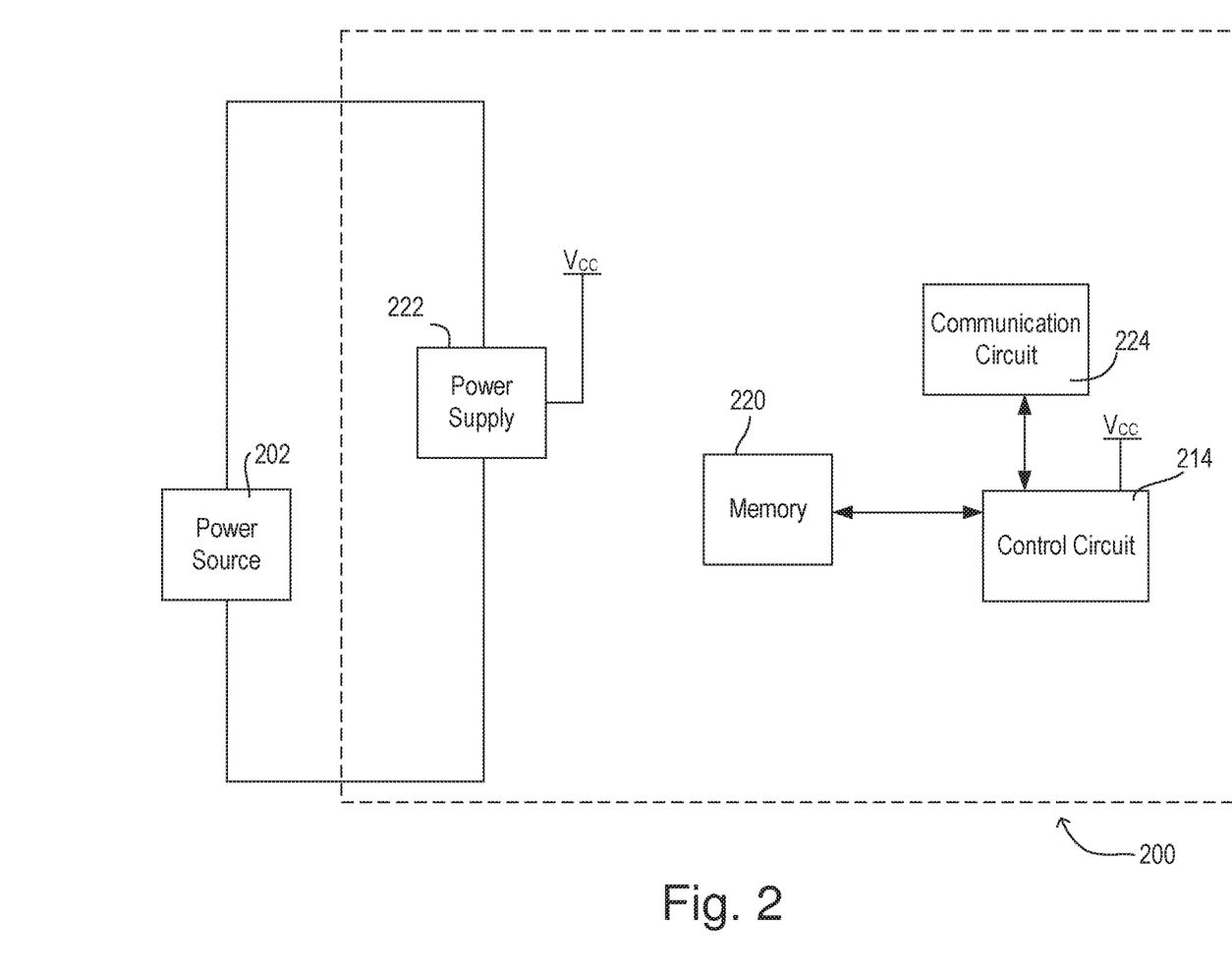
FIG. 2 is an example block diagram of a wireless device.

FIG. 2 is an example block circuit diagram of a wireless device 200, such as may represent any of wireless devices shown and/or described in FIG. 1. The device 200 may be powered by a power source 202. The power source 202 may be any suitable alternating current (AC) or direct current (DC) power source. For example, the power source 202 may be an AC line voltage. Alternatively, the power source 202 may be a DC power source, such as a 12- or 48-volt supply provided by low voltage wires, Power over Ethernet (PoE), one or more batteries, solar cell(s), etc. The device may contain at least one power supply 222 which supplies a voltage $V_{CC}$ for powering the electronic circuitry of the device. The power supply 222 may be integrated with the device, or the power supply may be provided as an AC-to-DC power supply adapter which may be used to connect the device to a wall receptacle, such as power source 202.

The device 200 may have a control circuit 214. The control circuit may be powered by the voltage $V_{CC}$ provided by the power supply 222. The control circuit may include one or more of a processor(s) e.g., a microprocessor(s)), a microcontroller(s), a programmable logic device(s) (PLD), a field programmable gate array(s) (FPGA), an application specific integrated circuit(s) (ASIC), or any suitable controller or processing device or combination thereof.

The device 200 may contain one or more communication circuits 224 which are operably connected to the control circuit 214. The communication circuit 224 may be a wireless communication circuit and may send or receive wireless commands and/or data to/from an external device or a network. For example, the communication circuit 224 may be a radio transceiver, configured to transmit and receive messages of an RF protocol, for example, a Bluetooth protocol, via one or more antennas (not shown). Additionally, the device 200 may also have a wired communication circuit, for example, a communication circuit configured to be connected to a USB-C, Ethernet or Cat5, Serial cable, or any other type of communication wiring.

The device 200 may have one or more memory modules ("memory") 220 (including volatile and/or non-volatile memory modules) that may be non-removable memory modules and/or removable memory modules. Memory 220 may be communicatively coupled to the control circuit 414. Non-removable memory 220 may include random-access memory (RAM), read-only memory (ROM), a hard disk, or any other type of non-removable memory storage. Removable memory 220 may include a subscriber identity module (SIM) card, a memory stick, a memory card, or any other type of removable memory. The memory 220 may store one or more software based control applications that include instructions that are executed by the control circuit 214. The control circuit, when executing such instructions, may provide the functionality described herein. The memory may also store data including operating parameters or received wireless commands.

The wireless device 200 may include additional circuitry not shown here, including, but not limited to: actuators, light emitting diodes (LEDs), load control circuitry, passive infrared occupancy sensing, microwave occupancy sensing, ambient light sensing, timeclock or time-of-day tracking, and the like.

Figure 3:
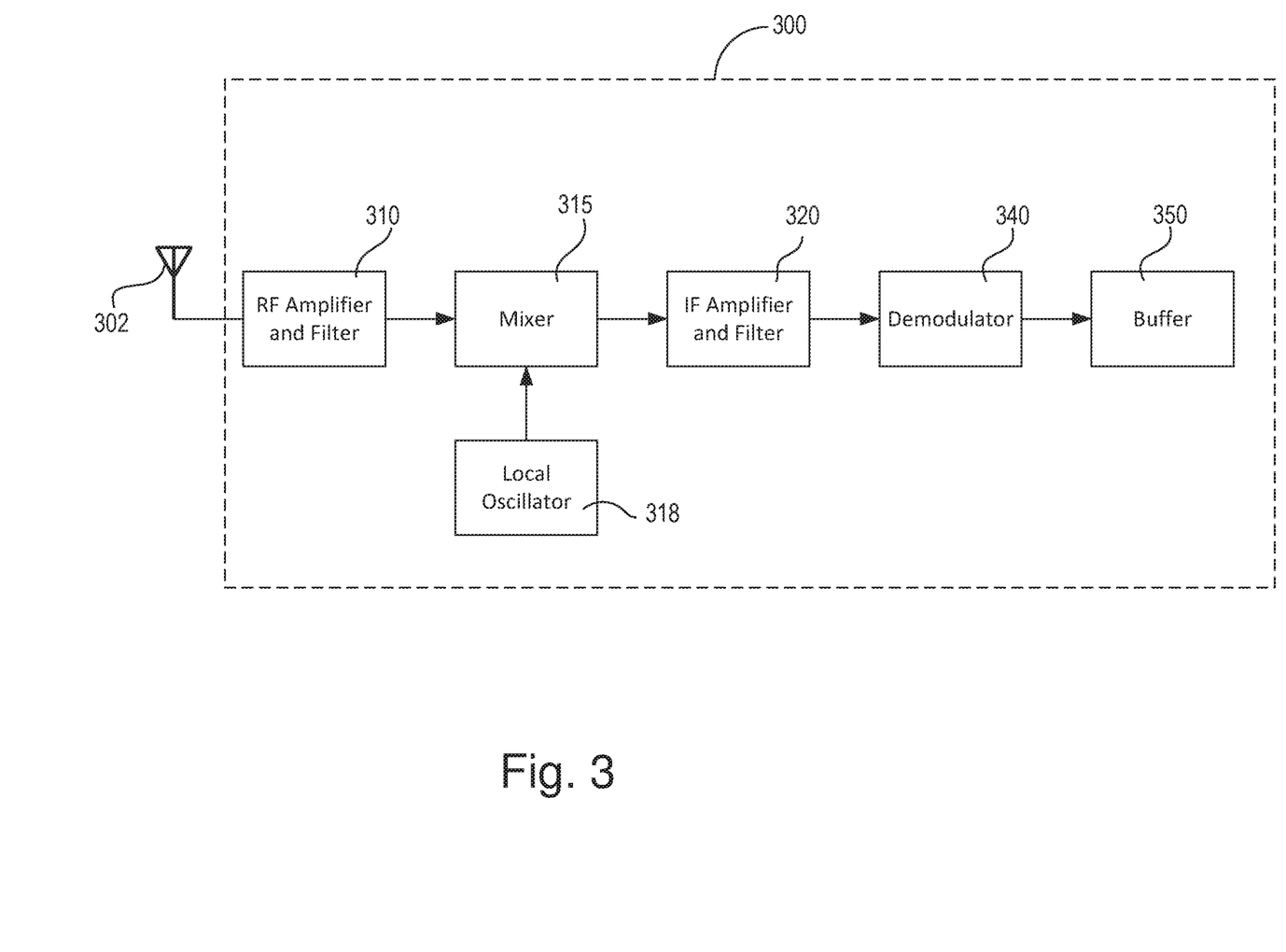
FIG. 3 is an example block diagram of a wireless receiver of the wireless device of FIG. 2.

FIG. 3 is a block diagram of an example wireless receiver 300 which may receive and process (i.e., demodulate) wireless RF packets. For example, the wireless receiver 300 may be the same as, or a component of, the communication circuit 224 of FIG. 2. The wireless receiver may be electrically coupled to an antenna 302. The wireless receiver may contain a combination of analog components and an integrated circuit(s) (IC) (i.e., a radio chip), or the antenna may be fed directly to the radio chip (i.e., without intermediate components). The antenna may be a trace on a printed circuit board, such as planar inverted F antenna (PIFA); a chip antenna; a wire antenna; or the like.

The antenna may receive wireless RF signals. The RF signals may include RF packets, which may contain a message, or original signal, that a wireless transmitter has modulated with a carrier wave according to a modulation type. Example modulation types include frequency shift keying (FSK), phase shift keying (PSK), quadrature phase shift keying (QPSK), etc. Other modulation types are known and may be used.

The wireless receiver 300 may include an RF amplifier and filter 310. The RF signals received by the antenna 302 may pass through the RF amplifier and filter 310. The RF amplifier and filter 310 may include one or more filter stages and/or amplification stages to filter the received RF signals and to boost the amplitude of the incoming RF signal. For example, the filter stages may include wide-band bandpass filter stages that quickly reduce the frequency bandwidth of the incoming signals. For example, a wide-band filter for RF packets at a 2.4 GHz carrier frequency may be approximately 100 MHz, or at least the width of the entire frequency band comprising all of the communication channels. The RF amplifier and filter 310 may also contain an automatic gain control (AGC) to automatically scale (i.e., adjust) the magnitude of the signal for better processing, which may, for example, amplify or reduce the signal.

The filtered and amplified RF signal may then pass through a mixer 315, where the filtered and amplified RF signal may quickly be mixed with another lower frequency signal supplied by a local oscillator (LO) 318. The LO 318 may be internal to the wireless receiver 300, or it may be an external crystal oscillator, for example, such as a quartz resonator. The mixer 315 may use the LO 318 to downconvert the frequency, that is, to mix the frequency of the RF signal down to a baseband or intermediate frequency (IF). For example, the RF signal may be a high-frequency signal, such as a 2.4 GHz frequency signal, whereas the LO signal may be the same frequency or a different frequency, such as a lower frequency.

The mixer 315 may multiply, or heterodyne, the RF signal with the LO signal 318, to create an intermediate frequency IF signal. The IF signal may contain beat frequencies containing both the sum and the difference of the RF signal and LO signal. The IF signal output of the mixer may be received by one or more IF amplifier and filter stages 320, which may bandwidth limit the incoming IF signal to remove one of the sum and difference signals (unwanted image signal) and amplify the remaining signal. For example, the IF amplifier and filter 320 may remove the high frequency component of the IF signal, that is, the sum of the original RF signal and LO signal may be removed, while the remaining difference signal may be amplified. The throughput of wireless signals through the IF amplifier and filter 320 may be relatively slow in comparison to the first two stages (the RF amplifier and filter 310 and the mixer 315).

The remaining RF signal at the intermediate frequency (that is, the filtered IF signal) may then pass through a demodulator 340. The demodulator 340 may receive and lock on (i.e., synchronize to) the filtered IF signal and may demodulate, or separate out, the original signal from the carrier wave. For example, the demodulator may sync (synchronize) to the RF signal by aligning with the edges/transitions of each bit. The demodulator may contain various subcomponents, for example, an analog-to-digital converter (ADC), digital filter(s), automatic gain control (AGC), etc. The demodulator may have a front end which may include a preselector and a signal sampler. The preselector may include one or more digital filters for further refining the filtered IF signal. The signal sampler may slice the signal into bits of ones and zeros. The front end slices the symbols by sampling and windowing the IF signal to detect edges/transitions of each bit. The back end of the demodulator may receive the sliced sampled symbol and interpret the RF packet using a correlator, or digital signal processor (DSP). For example, as the demodulator processes the IF signal by sampling and windowing to resolve the IF signal into bits, the resolved bits may be stored in a buffer 350.

Figure 4A:
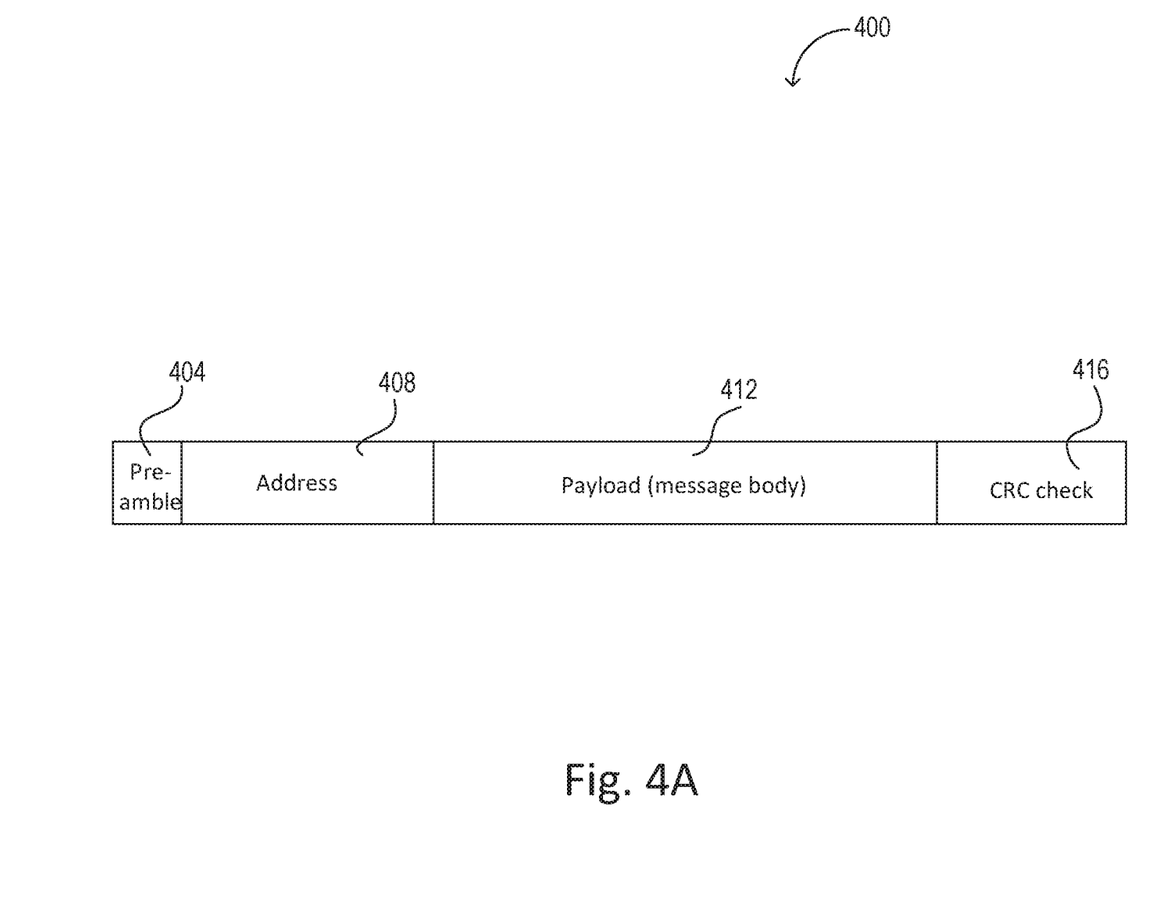
FIG. 4A is a diagram illustrating the components of an example RF packet.

FIG. 4A is an example RF packet 400. The RF packet 400 may be at least 13 bytes in length, for example. Each portion of the packet 400 is described with an example length in bits for a Bluetooth packet. One will understand, however, that the lengths of packet 400, or portions of the packet 400, or any other packet described herein, are for illustration purposes only, and the examples described herein may also be applied to packets or portions of packets which are shorter or longer in length than those described herein.

The RF packet 400 may contain a preamble 404. The preamble 404 may be approximately one byte in length, for example. The preamble 404 may alert a wireless receiver that an incoming RF packet is being received. In response to detecting the preamble 404, the wireless receiver may lock on (i.e., synchronizing to) to the RF packet 400 using the bits of the preamble 404 in order to receive and demodulate the RF packet 400.

The preamble may be followed by an address 408. The address 408 may be approximately four bytes in length, for example. The address may indicate to the wireless receiver which wireless device is the intended recipient of the message. It may further identify the wireless device from which the message was sent. The address may be any sequence of digits, characters, or combination of digits and characters, for example, a hexadecimal address.

Subsequent to the address 408, the RF packet 400 may contain a payload 412. The payload 412 may be six or more bytes in length, for example, and may contain the message body. The message body of the payload 412 may contain instructions which the wireless device may execute upon receipt and processing of the packet 400. For example, the wireless receiver may be part of a wireless lighting load. The wireless receiver may receive the RF packet 400 from a load control device, such as a wireless dimmer. The payload 412 may include a lighting control command from the wireless dimmer instructing the wireless lighting load to increase or decrease an intensity of the wireless lighting load, for example. For example, the payload 412 may include a command to set the intensity of the wireless lighting load to seventy-five percent.

The payload 412 may be followed by an error check 416. For example, the error check may be a check sum or cyclic redundancy check (CRC). The wireless receiver may use the error check 416 to determine whether the packet 400 has been accurately received. If the wireless receiver determines that the packet has been accurately received, the wireless device of the wireless receiver may carry out the instructions indicated in the payload 412. For example, according to the previous example, the wireless lighting load may then change the intensity of the lighting load to seventy-five percent.

However, if the wireless receiver determines that the packet has been corrupted, that is, an interfering RF packet or stray RF transmissions have corrupted one or more bits of the packet 400, the error check may flag the wireless receiver that the message 400 has been corrupted. If the wireless receiver determines that the RF packet 400 has been corrupted, the wireless receiver may drop the packet 400.

Figure 4B:
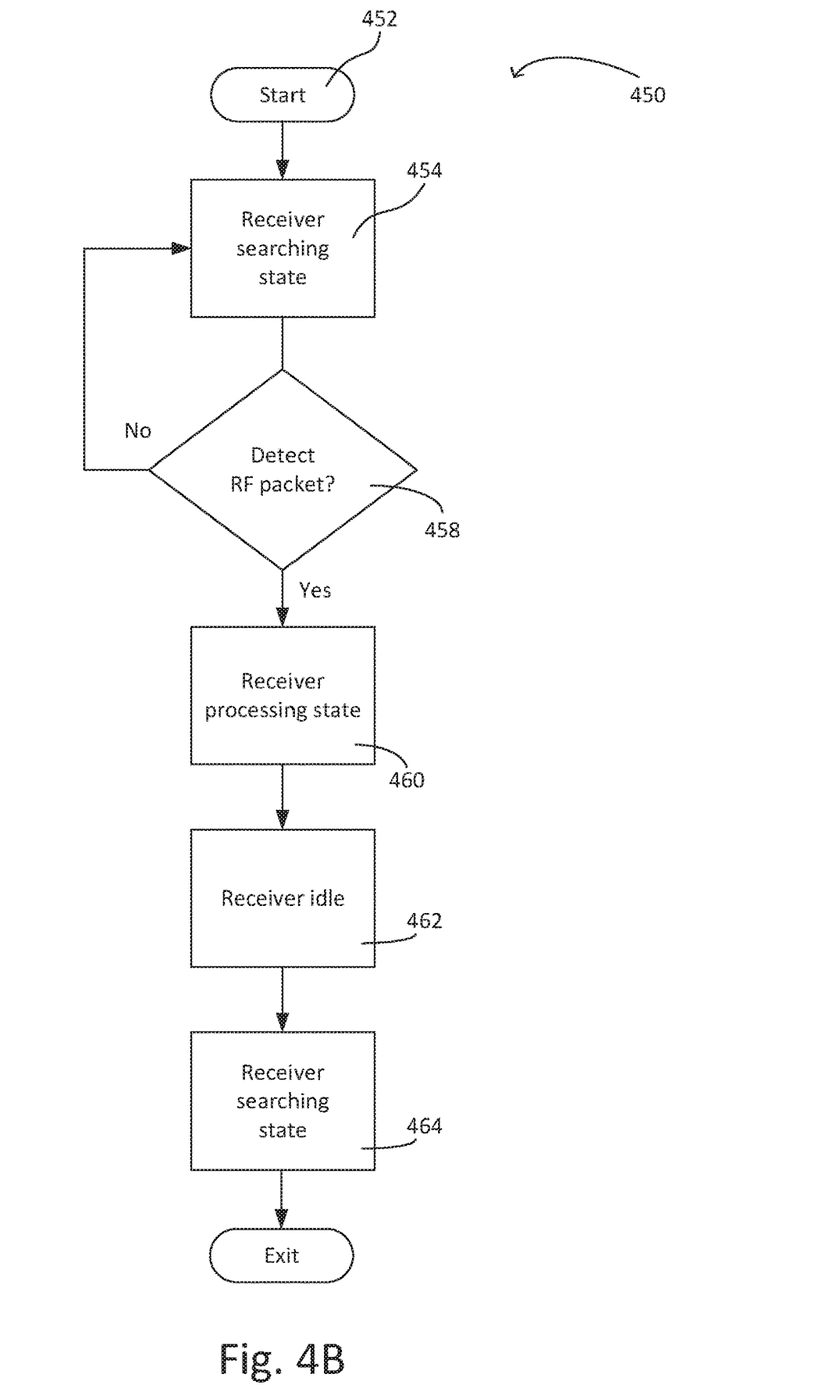
FIG. 4B is an example method showing a wireless receiver changing states in response to detecting an RF packet.

FIG. 4B is an example method 450 that may be executed by a wireless receiver, such as wireless receiver 300 of FIG. 3, to receive an RF packet. The method 450 may start at 452. The wireless receiver may enter a searching state at step 454 where the receiver is responsive to receiving RF packets. The bandwidth filters of the wireless receiver may be opened up (i.e., set to a wide bandwidth in the searching state) to receive an RF packet. At step 458, the receiver may determine whether an RF packet has been detected. For example, the receiver may determine that an RF packet has been received if a preamble of an RF packet has been recognized. If no preamble is detected (i.e., no RF packet is detected) at step 458, the wireless receiver may remain in the searching state at step 454 to receive RF packets.

If the receiver detects an RF packet, the receiver may change state to enter a processing state at step 460. During the processing state, the receiver may lock on (i.e., sync) to the RF packet that is being received. For example, the receiver may additionally adjust the bandwidth and/or gain of one or more filters and/or gain stages to receive the RF packet and process the message payload. After the RF packet has been fully received (i.e., the CRC or error check was successful), the receiver may become idle (i.e., not processing an RF packet) at step 462. (One will understand the receiver may also or alternatively become idle in when the error check is not successful, i.e., after the receiver has dropped the packet). The receiver may optionally idle while transitioning to the searching state and searching for new RF packets. For example, the wireless receiver may transition from idle to the searching state at step 464. To enter the receive searching state, the wireless receiver may open up (i.e., widen) the bandwidth of one or more filters, and/or may adjust the gain stages to search for new RF packets. The method may then end.

When the receiver enters the processing state at step 460 to process the RF packet currently being received, the wireless receiver may not be responsive to other RF packets at that time. However, if a second interfering RF packet has been transmitted which overlaps with (i.e., interferes with) the first RF packet that is currently being received by the wireless receiver, the second interfering RF packet may corrupt the message payload of the first RF packet. When the wireless receiver processes and then error checks the first RF packet, the wireless receiver may determine that the first RF packet has been corrupted and the RF receiver may discard the first RF packet (i.e., the receiver may return to the searching state). However, after the wireless receiver has attempted to process the entire first packet, it may be too late for the wireless receiver to receive the second interfering packet, and both RF packets may be lost.

Figure 5:
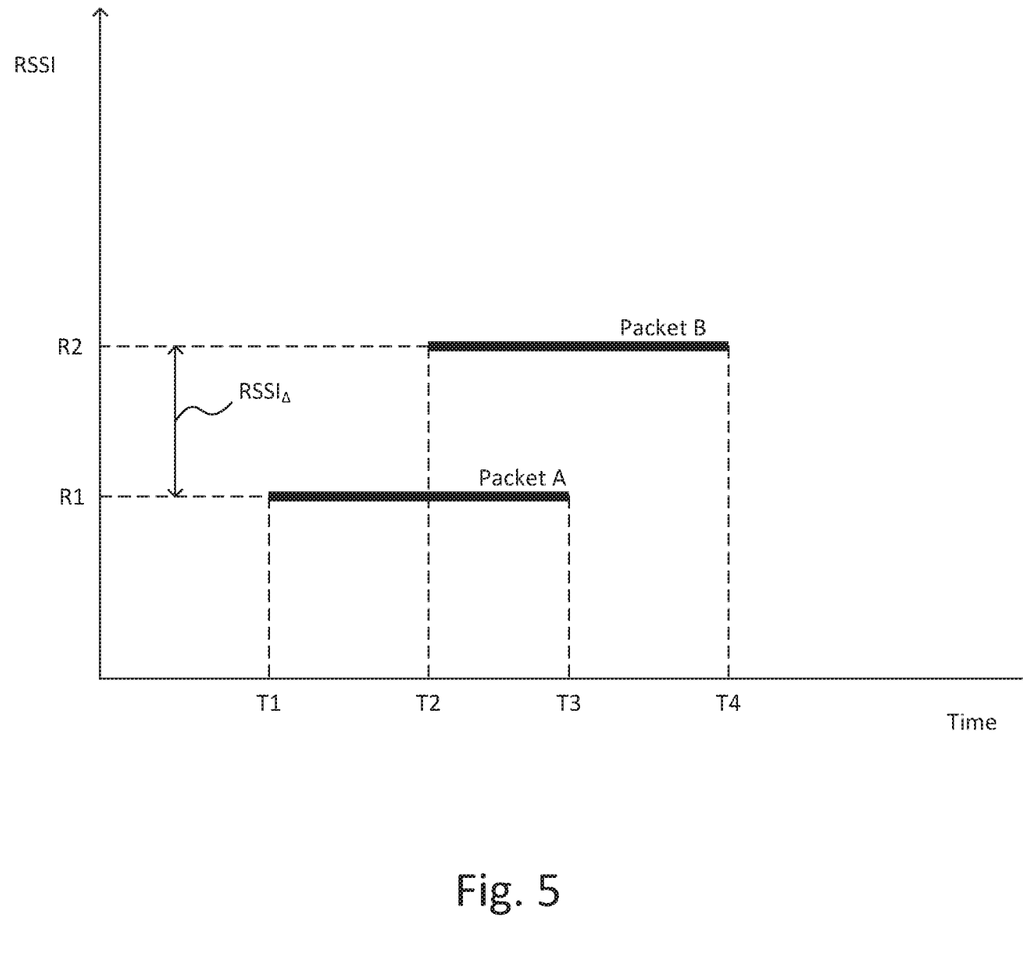
FIG. 5 is a diagram of a packet collision.

FIG. 5 is an example chart of two messages being received by a wireless receiver (for example, the wireless receiver 300 of FIG. 3) of a wireless device where the two messages overlap in time (i.e., the messages interfere with one another). The wireless receiver (that is, the radio transceiver) of the wireless device may begin receiving a first packet, packet A, at time T1. Packet A may have a received signal strength indicator (RSSI) R1, as shown. While the wireless receiver is receiving packet A, a second packet, packet B, may begin to overlap packet A at time T2. Packet B may have an RSSI of R2, as shown, which may be greater than the R1 of packet A. Therefore, packet B may be a stronger packet than packet A. When a second packet or interfering packet with a stronger signal than the first packet reaches the receiver, the stronger interfering packet may overlap and corrupt the data of the first packet. That is, when packet B with a stronger signal R2 overlaps packet A with a lower R1, the data of packet A may be corrupted.

At time T3, towards the end of where packet A has been fully received (along with the beginning of packet B), the wireless receiver will determine whether the message content of packet A has been corrupted by performing an error check. The error check may be any one of a number of known error check methods, for example, cyclic redundancy check (CRC), parity, checksums, Hamming codes, Message Authentication codes, etc. The wireless receiver may use the error check to determine whether packet A contains an error, (e.g., a framing error), which may indicate that packet A contains a high percent of errored data and therefore the message cannot be processed. Because packet B is overlapping in time with packet A and has a stronger signal strength RSSI R2 greater than packet A's RSSI R1, packet A may contain errors and the message of packet A therefore may be lost (i.e., dropped).

For certain protocol implementations, (e.g., the Bluetooth protocol), in addition to losing packet A, the wireless receiver may also drop packet B. The wireless receiver may drop packet B because the wireless receiver is not able to detect an interfering packet, or, if the interfering packet is detected, the wireless receiver may not respond quickly enough to receive the interfering packet. When the wireless receiver does not resynchronize/lock on to packet B, the receipt of both RF packet A and B is delayed until additional redundant first and second RF packets are received.

This delay in the response time of the receiver may be undesirable, particularly for applications such as lighting control, where a user expects near instantaneous response for lighting control commands. For example, if a user 105 of FIG. 1 presses a button on a lighting control device 104, the user may expect one or more lighting loads 110A, 110B to turn on without a delay (or with minimal delay). In a heavily congested RF environment, the delay may occur, which may be unacceptable.

To minimize the delay and prevent both RF packets from being dropped, the wireless receiver may detect at time T2 that a second interfering packet (packet B) is being received while the wireless receiver is receiving packet A. Quick detection that an interference is occurring may allow the wireless receiver to determine that packet A contains errored data at time T2, instead of at time T3, and giving the wireless receiver time to react to the interference and receive packet B.

Upon determining that a second stronger packet B is interfering with packet A at time T2, the wireless receiver may attempt to recover the second packet B. To recover the second packet B, the wireless receiver may resynchronize (resync) to receive packet B through the end of the packet length at time T4. For this to happen, the signal strength (e.g., RSSI, power, or signal to noise ratio (SNR)) of the second RF packet may need to be greater than the signal strength of the first RF packet by more than a threshold amount. For example, the difference in RSSI (that is, $RSSI_A$) between packet B (R2) and packet A (R1) may need to be greater than a threshold, $RSSI_{thresh}$, as shown in the equation below:

$$|R2-R1|>RSSI_{thresh}$$

For example, $RSSI_{thresh}$ may be 10 or 12 dB, although other examples are possible. If the second RF packet has a greater RSSI than the first RF packet by more than $RSSI_{thresh}$, resyncing the front end of the demodulator may allow the receiver to lock on to the second RF packet and correctly receive it. However, if the second RF packet has a signal strength greater than the first RF packet by an amount less than $RSSI_{thresh}$, the second RF packet may not be distinguishable over the first RF packet. One will recognize that although the difference in signal strength is described herein as using RSSI, other characteristics may alternatively be used, such as power, or signal to noise ratio (SNR), for example.

To resync, the receiver may cause the demodulator to stop demodulating the current first RF packet and may further clear the buffer of stored resolved bits. The receiver may then resynchronize to the second interfering RF packet. This may further include adjusting one or more gain stages and/or adjusting the bandwidth of the receiver, although one will recognize that the power level of the second interfering RF packet may be close enough to the first RF packet such that adjustment of one or more gain stages and/or the bandwidth may not be necessary.

To trigger a resync of the demodulator of the wireless receiver such that packet B may be received and demodulated, one or more methods of detecting a second interfering packet (such as packet B at time T2, for example), may be used, according to the following implementations. For example, according to a first example, the wireless receiver may recognize a specific resync byte sequence of the interfering packet. In a second example, the wireless receiver may detect a jump in RSSI where $RSSI_A$ is greater than $RSSI_{thresh}$. According to a third example, the wireless receiver may detect an unexpected phase shift while receiving the first message. Each of these methods will be described in greater detail in the examples herein.

According to one example, the wireless receiver may detect a second stronger interfering RF packet by recognizing a specific resync byte sequence of the interfering packet. The specific resync byte sequence may be any combination of bits that the wireless receiver is configured to recognize as a resync trigger. For example, the specific resync byte sequence may include a reserved bit sequence that does not occur in an RF packet other than the specific resync byte sequence. The specific resync byte sequence may allow the wireless receiver to prioritize any RF packet containing the specific resync byte sequence by causing the wireless receiver to resync and receive the RF packet, irrespective of the state of the receiver. For example, the receiver may be in the middle of receiving a first RF packet while the specific resync byte sequence is received, causing the receiver to change state from a receiving processing state to a receiving searching state. The change in state during the resync may cause the wireless receiver to disregard (i.e., drop) the first RF packet. By changing state again from the receiving searching to the receiving processing state, the receiver may recover and lock on to receive the second interfering RF packet.

Figure 6:
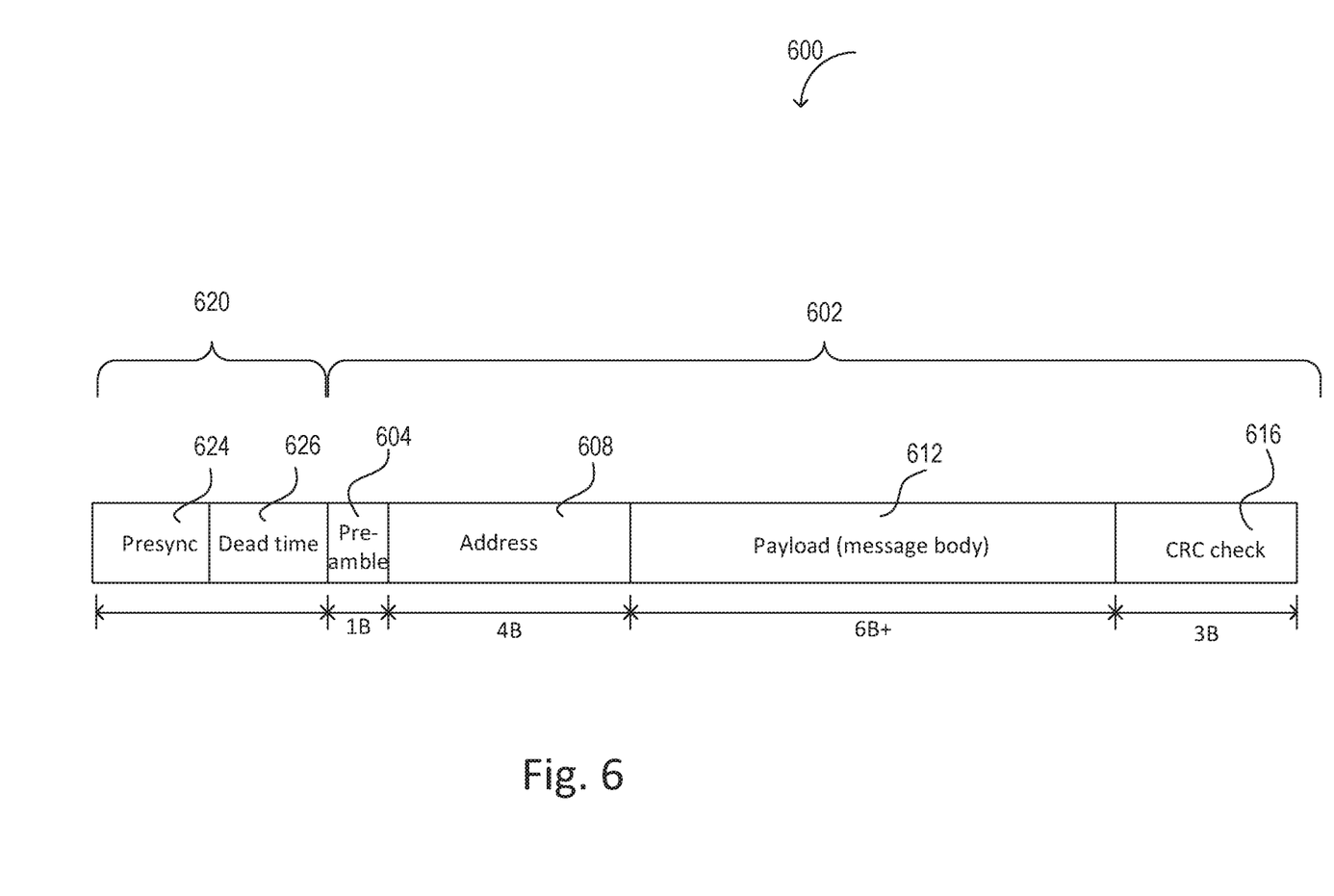
FIG. 6 is a diagram of an example RF packet with a prepended presync.

FIG. 6 is an example structure of an RF packet 600 which may include a specific resync byte sequence. Portion 602 of the RF packet 600 may be a regular protocol packet, for example, the RF packet 400 of FIG. 4A, which may not cause a resync of a wireless receiver. For example, the protocol packet 602 may be a standard protocol packet, such as Bluetooth protocol packet, or any other protocol packet, including a proprietary protocol. For example, each RF packet processed by a wireless receiver, such as the receiver 300 of FIG. 3, may comply with a protocol standard (i.e., a Bluetooth standard). That is, each packet demodulated by the wireless receiver may include at least the standard components of the standard protocol packet 602. Each portion of the packet 600 is shown with an example length in bits for a Bluetooth packet.

The portion 602 of the RF packet 600 may be the same as the RF packet 400 shown in FIG. 4A. For example, the RF packet 602 may contain a preamble 604, an address 608, a payload 612, and a CRC or error check 616, which may correspond to the preamble 404, address 408, payload 412, and CRC or error check 416 of packet 400 in FIG. 4A.

A wireless transmitter of a wireless device may modify the RF packet 602 to create the RF packet 600 by pre-appending portion 620. Portion 620 may contain a presync 624, that is, a presync prepended before the packet preamble. The presync 624 may contain a specific resync byte sequence, followed by a dead time 626. The dead time 626 may be any sequence of bits which take up time to allow the receiver to resync. For example, the specific resync byte sequence may trigger the wireless receiver to undergo a resync as previously described. The wireless receiver may then resync during the dead time 626 following the specific resync byte sequence of the presync 624, allowing the wireless receiver to lock on (i.e., sync) to the packet 600 using preamble 604. For example, the dead time 626 after the presync 624 may contain bits that are all zeros, or alternating ones and zeros, although other examples are possible.

Although the portion 620 including the presync 624 has been described as prepended before the preamble 604 of the standard protocol packet 602, one will understand that other configurations are possible. For example, the presync may be part of the preamble 604, or may be included immediately prior to the preamble 604 (i.e., the dead time 626 may be removed).

When the wireless receiver begins receiving a first packet, receipt of the specific resync byte sequence of the presync 624 during receipt of the first packet may indicate to the wireless receiver that a second interfering RF packet is being received. The wireless receiver may resync in response to the specific resync byte sequence of the presync 624 of the second interfering RF packet. The wireless receiver may then lock on to and receive the entire second interfering RF packet, provided that the second interfering RF packet has an $RSSI_A$ (or power or SNR greater than the threshold) greater than $RSSI_{thresh}$.

The specific resync byte sequence may be any number of bits or bytes in length, for example, 4 bytes in length. For example, protocols exist for which the resync code is as short as a single byte. This may allow the wireless receiver to identify a packet which is specifically intended for it, as opposed to random messages in the space. Additionally, other devices which may transmit using the standard protocol without the specific resync byte sequence may still be received by the receiver.

A longer specific resync byte sequence (presync) may have a decreased probability that any other message traffic may unintentionally contain the specific resync byte sequence (presync). For example, if the transmitted RF packet (or any interference to a transmitted RF packet) happens to contain a segment within the payload or address that matches the bit/byte sequence of the presync, the receiver may recognize the bit/byte sequence within the message and erroneously treat it as the presync. This may cause the message to be lost or dropped as the wireless receiver resyncs and looks for a preamble.

The longer the specific resync byte sequence, (that is, the greater number of bits), the probability that the payload or message portion of an RF packet may unintentionally contain the specific resync byte sequence may greatly decrease. For example, the probability of a bit sequence within the message matching the specific resync byte sequence may be expressed as $2^{(-n)}$, where n is the number of bits in the resync code.

For wireless devices which both transmit and receive RF packets, the radio transceiver may modify the transmitted RF packets such that the RF packets transmitted by the wireless transmitter of the device won't reset the wireless receiver of the transmitting device. Several options to implement this exist, including, for example, the use of a coded physical layer (PHY) as described herein, although other techniques are also possible.

In a first example, the wireless device may use a coded PHY, which may ensure that transmitted packets from the wireless transmitter of the device will not reset the device's own wireless receiver. For example, a coded PHY may replace all bits of "0" in the original bitstream with a "01" sequence, and may further replace all bits of "1" in the original bitstream with a "10" sequence. The wireless transmitter may then transmit the message with the coded PHY. The coded PHY may prevent more than two "0"s or two "F"s being transmitted sequentially, and allows a sequence of three or more "1"s or "0"s in a row to be used to force a resync without the risk of this sequence appearing in valid data (allowing, for example, the presync to be a sequence of "1111" or "0000". However, it should be noted that this coding scheme doubles the number of transmitted bits, similar to a universal asynchronous receiver-transmitter (UART) coding scheme which increases the number of transmitted bits by twenty-five percent (i.e., ten bits transmitted for every eight in the original data). One will recognize that receivers which receive an RF packet from the transmitter containing the coded PHY may further decode the coded PHY in order to process the message.

The use of a coded PHY is also similar to byte stuffing. For example, in byte stuffing, if the specific resync byte sequence used to force a resync was the code 0x5A, this sequence may be excluded from the transmitted data by replacing occurrences of 0x5A in the transmitted data with a multi-byte code such as 0x00,0x01. Under such a scheme, occurrences of the code 0x00 in the original data would be replaced with the sequence 0x00,0x00. The 0x00 may be referred to as an "escape character" and the various sequences as "escape sequences" or "escape codes." Given the existence of an escape character, more than one particular byte may be excluded from the data (e.g., in the example above, up to 255 byte patterns may be excluded from the data stream using various escape sequences starting with the 0x00 escape character).

It should be noted that use of break characters within a payload of the RF packet, or framing errors, to force a demodulator resync of the receivers is a common technique even in wired protocols. However, the techniques described herein provide a method by which a wireless receiver may be adapted to receive an interfering RF packet of any standard protocol which does not provide for receiving a stronger interfering RF packet (e.g., a Bluetooth protocol, or any other standard or proprietary protocol), while allowing the wireless receiver to also receive standard protocol RF packets as well, such that the wireless receiver not only has enhanced packet receipt capability, but is also backwards-compatible with existing protocol architectures. That is, this may allow a wireless receiver to resync irrespective of the state of the receiver.

Alternative to using a specific resync byte sequence, according to a second example, the wireless receiver may detect a jump, or step change, in the signal being received. For example, one or more filter stages (e.g., the RF amplifier and filter 310 of FIG. 3) may be used to quickly detect a jump in RSSI. Or, the demodulator (e.g., the demodulator 340 of FIG. 3) of the wireless receiver may detect a jump in RSSI. Although the method described herein is with respect to a jump in RSSI, one will understand that a jump in power or signal to noise ratio (SNR) may equivalently be used. A jump in RSSI (or power, or SNR) may be defined as an instantaneous increase from a first value to a second value.

A step change (that is, a jump) in RSSI from a first value to a second value while a first message is being received may indicate that a second message with a higher RSSI is interfering. The wireless receiver may detect an RSSI jump by monitoring the RSSI of the sampled signal for a step change or hysteresis. As an example, the detection of an RSSI jump by the demodulator of the wireless receiver may trigger an interrupt. It is known to trigger an interrupt to adjust the automatic gain control (AGC) to allow the wireless receiver to readjust to the new RSSI level. However, an interrupt may also be used according to this example to resync the demodulator as previously described, since the jump in RSSI assumes a second stronger message is being received.

One will recognize that an RF packet may have an RSSI increase mid-message for reasons other than an RF collision of an interfering RF packet. For example, a moving target may cause a gradual increase in RSSI. Or, electrical changes or events on a printed circuit board (PCB) of the wireless receiver may impact the antenna and/or wireless receiver, thereby falsely causing an apparent RSSI jump. To prevent the wireless receiver from erroneously resyncing the demodulator in these cases and losing the RF packet, an RSSI jump threshold may be used. That is, the demodulator may only resync when the RSSI jump is greater than the threshold. In this way, erroneous resyncing may be mitigated. The threshold amount may be, for example, the $RSSI_{thresh}$ as previously described. However, other values may also be used. For example, if it is known that electrical events on the PCB may cause RSSI jumps of up to 12 dB, an RSSI threshold of 15 dB may be used.

According to another example, the wireless receiver may detect a phase shift in one or more data symbols while a first message is being received, and in response to the detected phase shift, determine that a second stronger message is interfering. The phase shift may be detected by the wireless receiver. For a sampling rate of 16 samples per bit, a phase shift may be detected when an apparent bit of the message is longer or shorter than expected. This may indicate that a second message having a different phase than the first message is interfering with the first message (i.e., being received at the same time). The demodulator may detect a phase shift by detecting edges in the bits or symbols which appear in unexpected places. For example, the signal may contain oversampled data, that is, several samples may comprise a single bit. As part of a downsampling routine, the demodulator may convert the oversampled data to a stream of bits. In order to downsample the oversampled signal, the demodulator must align the downsampling routine such that the oversampled data will match up within a window to one or more bits (i.e., discrete "1"s or "0"s). Therefore, the demodulator may detect a phase shift by detecting edges in the oversampled data for the purpose of aligning the downsampling routine. The sampler of the demodulator may expect these edges to be separated by a multiple of the oversampling rate. Therefore, a phase shift may readily be detected when the sample count between edges deviates from the multiple by more than a threshold. Similarly, the downsampling may be accomplished by a voting scheme (i.e., for a 16× oversample the output would be a 1 if more than 8 of the samples are high). A phase shift (or noise event) may be detected when the number of high or low samples is in an anomalous range (e.g. 5-11), thus causing doubt in the veracity of the downsampled bit output. For example, when the bits or symbols are properly aligned, an expected count would be sixteen of one value (either "0" or "1") and zero counts of the other value (either "1" or "0"). A few samples of discrepancy may be attributed to drift of the symbol or bit (i.e., jitter), or minor noise. However, any number close to fifty percent may indicate relatively low confidence that the byte has been sampled correctly, even if constituting a majority.

Alternatively, the front end of the demodulator may detect a phase shift by detecting a rapid decrease in the jitter of a symbol edge. For example, the edge of a symbol or bit of an RF packet with an RSSI close to the noise floor may jitter or change in time. However, if the amount of phase jitter rapidly reduces such that the edges of the symbol or bit of the RF packet suddenly become clean (i.e., the jitter has reduced by more than a threshold amount), this may indicate that a second RF packet with a higher RSSI is being received (i.e., a second interfering RF packet may be corrupting the data of the first RF packet).

Figure 7A:
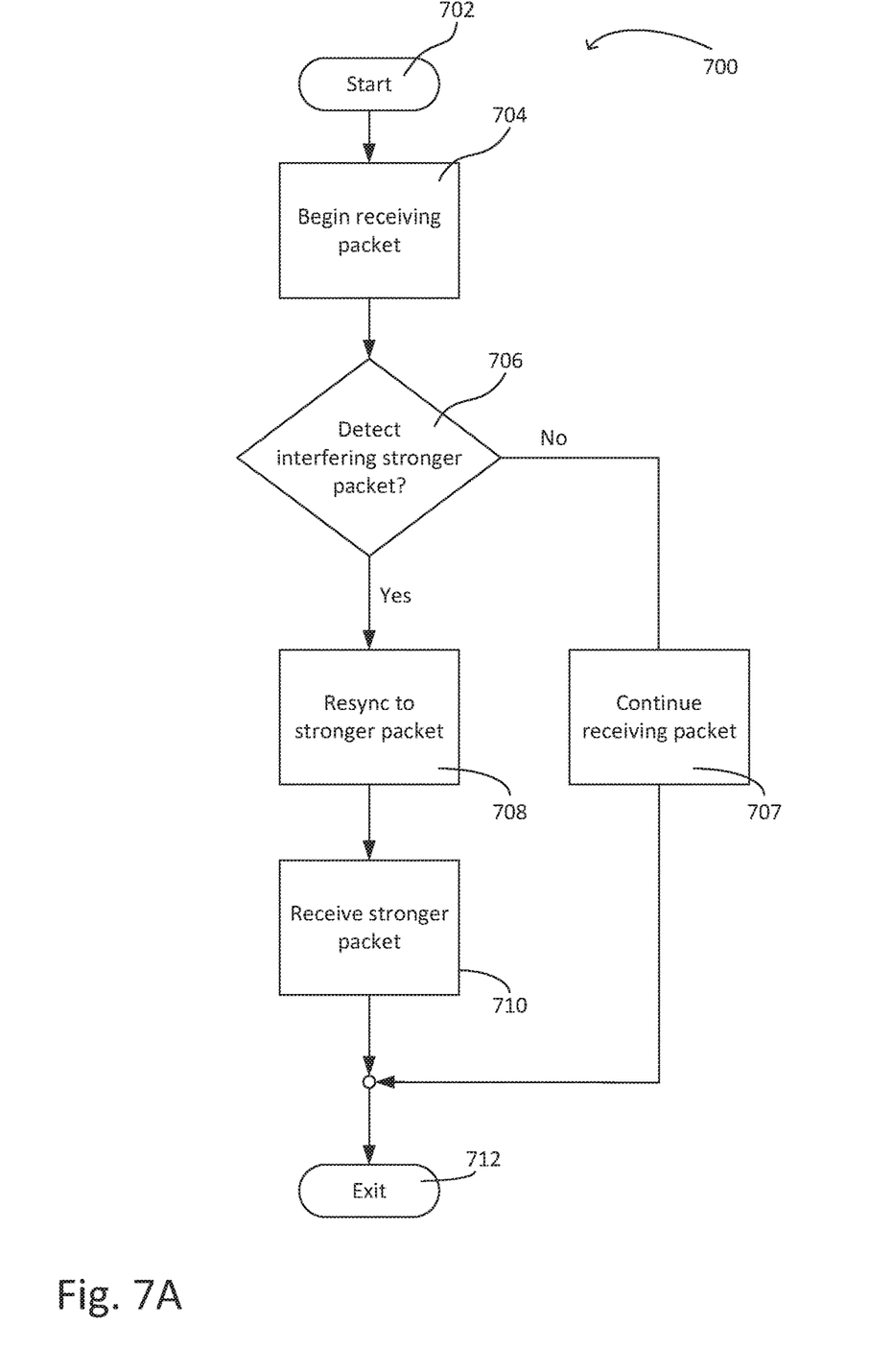
FIG. 7A is an example method depicting how a wireless receiver may detect an interfering second RF packet based on RSSI.

The resync of the wireless receiver may occur according to the method shown in FIG. 7A. FIG. 7A is an example method 700 which may be executed by a wireless receiver of a wireless device, such as the wireless receiver 300 of FIG. 3. The method may begin at step 702. At 704, the wireless receiver may begin receiving a first message, such as packet A of FIG. 4. At step 706, the wireless receiver may detect a stronger interfering message (i.e., a second message with an RSSI greater than the first message, such as packet B of FIG. 4). The wireless receiver may detect an interfering stronger message in any or a combination of several ways, which will be described in further detail herein.

If no stronger interfering message is detected at step 706, the wireless receiver may continue receiving the packet at step 732 and the method may exit at 712. Otherwise, the wireless receiver may resync to the stronger packet B. To resync, the wireless receiver may reset a portion of the circuitry internal to the receiver. The resync may occur in a very short amount of time, less than the length of packet (as opposed to a reset of the entire radio or wireless receiver, which may take longer than a packet length to reset). This may allow the wireless receiver to lock on to the second interfering stronger RF packet to receive the second RF packet, instead of losing/dropping both the first and second interfering RF packet.

The implementation of the wireless receiver resync may be specific to the wireless receiver used, with the result that the resync causes the wireless receiver to undergo a state change from a processing state to a search state in response to detecting the interfering packet. By transitioning states in the middle of receiving the first packet, the first packet will be lost (i.e., dropped), however, the second interfering RF packet may be received. In one example implementation, the radio transceiver may resync the front end of the demodulator. The resync may cause the demodulator to stop demodulating the current RF packet and the receiver may further clear the buffer of any previously demodulated/resolved bits. The demodulator may further resynchronize (i.e., lock on) to the edges of the incoming bits of the second interfering RF packet. When the front end of the demodulator, which tracks transitions between signals, is resynced, it may further go through a bandwidth cycle. The bandwidth cycle may briefly open up (i.e., widen) the frequency bandwidth of the received signal before narrowing the frequency bandwidth and locking on to the second message. This may allow the wireless receiver to rapidly lock on to the second packet, packet B, instead of going through a full reset of the wireless receiver, which may take much longer. For example, a reset of the wireless receiver, or of the radio transceiver, may cause the wireless receiver to go through a power or startup cycle. After the wireless receiver has resynced to packet B, the wireless receiver may receive the rest of the stronger message (packet B) at step 710. The method may then end at step 712.

Any of these methods described (presync, RSSI detection, phase detection) may further be used in combination to increase the reliability of detecting a second interfering RF packet. The use of two or more methods requires the wireless receiver to confirm that all conditions have been met before resyncing part of the radio. For example, the phase shift detection method may be used with the RSSI jump detection method. When the wireless receiver confirms that a first condition has been met (i.e., an $RSSI_A$ greater than $RSSI_{thresh}$ is present), the wireless receiver may wait to confirm that a second condition is also present before resyncing portions of the wireless receiver. For example, the wireless receiver may wait to confirm that a phase shift has also been detected before resyncing portions of the wireless receiver. In this way, the wireless receiver may more accurately be able to detect when an interfering RF packet is being received, and may only resync under this condition.

One will also recognize that a specific resync byte sequence may additionally or alternatively be used. For example, a specific resync byte sequence may be used with detecting an RSSI for a higher confidence rating that a second stronger message is actually being received during the receipt of the first message. Or, the specific resync byte sequence may be used with the phase shift detection. Alternatively, all three methods may be used in combination with each other.

Figure 7B:
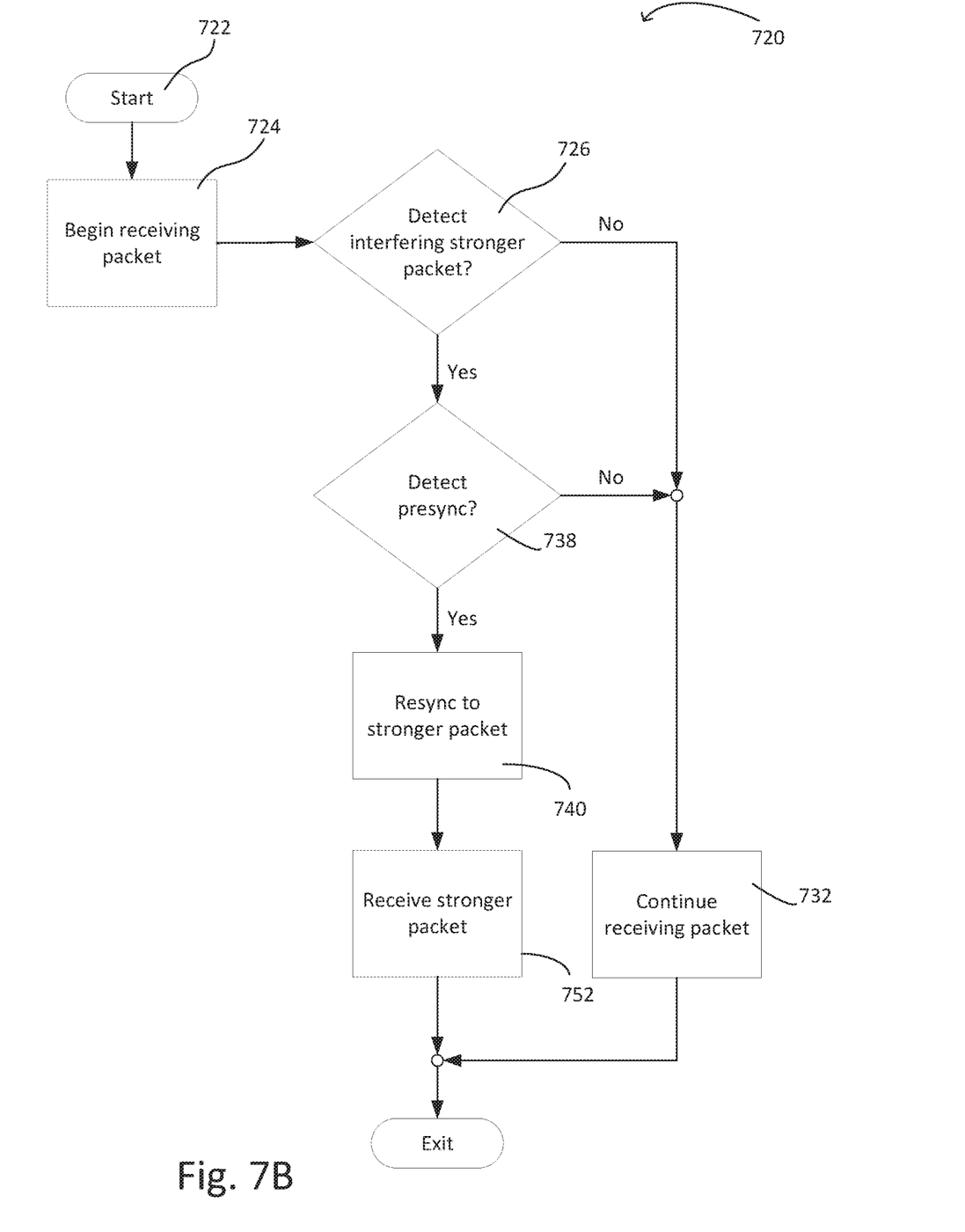
FIG. 7B is a second example method showing how a wireless receiver may latch on to an interfering RF packet using a presync and RSSI.

FIG. 7B is an example method 720 by which a wireless receiver may use the RSSI and specific resync byte sequence together to resync the receiver. The method may start at 722. The wireless receiver may begin receiving a first packet at step 724 (i.e., the receiver may transition from a searching state to a receiving/processing state). At step 726, the receiver may determine if a second interfering RF packet is being received. For example, the receiver may quickly detect a jump in RSSI at one or more of the filter amplifier stages as previously described. If no second packet has been received, the receiver may continue receiving and processing the first packet at step 732.

If, however, a jump in RSSI has been detected at 726, the receiver may further determine whether a specific resync byte sequence has been received at step 738. If the specific resync byte sequence has been received at step 738, the wireless receiver may resync and lock on to the second interfering packet at step 740. That is, the wireless receiver may transition states upon detecting the presync at step 738. For example, the wireless receiver may exit the current receive processing state and enter an idle state. The wireless receiver may then transition from the idle state to the receive searching state. The wireless receiver may then sync to the second interfering packet, transitioning again from the receive searching state back to the receive processing state to receive the second packet at step 752. One will understand that some wireless receivers may not enter an idle state but may change directly between the receive searching and receive processing states.

For example, a jump in RSSI may be quickly detected by a wireless receiver, whereas the specific resync byte sequence may take longer to detect, as the demodulator may need to process the specific resync byte sequence to recognize the sequence as a presync. In this way, detecting a jump in RSSI may prepare a receiver to quickly transition states to capture the interfering RF packet when the presync is detected. If no presync is detected, the wireless receiver may continue receiving the first packet at step 732 as previously described. The method may then exit.

Although Bluetooth is used as an example throughout this description, one will recognize that the examples described herein may additionally be applicable to other protocols, that is, any protocol which does not have a built-in detection and recovery method for packet collisions. In this way, the implementation of the examples described herein allows for a wireless receiver to receive packets according to the protocol which does not provide for detection and recovery of collided packets, and to further detect and recover packets during an RF collision event. Further, adding a presync to the standard protocol packet may allow a wireless receiver to receive packets of the standard protocol, as well as prioritized packets containing the presync, which may be captured during a collision event. One will understand this may be applicable to proprietary protocols as well.

What is claimed is:
1. A wireless device comprising:
   an antenna configured to communicate wireless signals;
   a transceiver operably connected to the antenna, wherein the transceiver is configured to:
   detect a first RF packet via the antenna;
   synchronize to and demodulate the first RF packet to create demodulated bits;
   store the demodulated bits of the first RF packet in a buffer;
   during the demodulation of the first RF packet, detect a second RF packet, wherein the second RF packet further comprises a preamble, a resync byte sequence prior to the preamble, a payload subsequent to the preamble, and one or more bits of dead time between the resync byte sequence and the preamble, wherein to detect the second RF packet comprises to detect the resync byte sequence;
   upon detection of the second RF packet, synchronize to the second RF packet and clear the demodulated bits from the buffer during the dead time;
   demodulate the second RF packet; and
   store the demodulated bits from the second RF packet in the buffer.
2. The wireless device of claim 1, wherein the first and second RF packets comprise Bluetooth packets.

3. The wireless device of claim 1, wherein to detect the second RF packet further comprises to detect an increase in RSSI greater than or equal to a threshold during receipt of the first RF packet.

4. The wireless device of claim 3, wherein the threshold is 10 dB.

5. The wireless device of claim 1, wherein to detect the second RF packet further comprises to detect an increase in RSSI greater than or equal to a threshold during demodulation of the first RF packet.

6. The wireless device of claim 1, wherein to detect the second RF packet further comprises to detect a phase shift in one or more data symbols during receipt of the first RF packet.

7. The wireless device of claim 1, wherein the second RF packet comprises a lighting control command.

8. A method of receiving an interfering RF packet, the method comprising:
   detecting a first RF packet;
   synchronizing to and demodulating the first RF packet to create demodulated bits;
   storing the demodulated bits of the first RF packet in a buffer;
   while demodulating the first RF packet, detecting a second RF packet, wherein the second RF packet comprises a preamble, a resync byte sequence prior to the preamble, and a payload subsequent to the preamble, and one or more bits of dead time between the resync byte sequence and the preamble, wherein detecting the second RF packet comprises detecting the resync byte sequence;
   upon detecting the second RF packet, synchronizing to the second RF packet and clearing the demodulated bits of the first RF packet from the buffer during the dead time;
   demodulating the second RF packet; and
   storing the demodulated bits from the second RF packet in the buffer.

9. The method of claim 8, wherein the first and second RF packets are Bluetooth packets.

10. The method of claim 8, wherein detecting the second RF packet further comprises detecting an increase in RSSI while receiving the first RF packet.

11. The method of claim 10, wherein the increase in RSSI is greater than a threshold.

12. The method of claim 11, wherein the threshold is 10 dB.

13. The method of claim 8, wherein detecting the second RF packet further comprises detecting a phase shift in one or more data symbols while receiving the first RF packet.

14. The method of claim 8, wherein the second RF packet comprises a lighting control command.

* * * * *